(12) United States Patent
Sundholm

(10) Patent No.: US 7,785,044 B2
(45) Date of Patent: Aug. 31, 2010

(54) METHOD AND APPARATUS FOR CONVEYING MATERIAL AND EJECTOR APPARATUS

(75) Inventor: Goran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 47 days.

(21) Appl. No.: 12/085,339

(22) PCT Filed: Apr. 13, 2006

(86) PCT No.: PCT/FI2006/000115

§ 371 (c)(1),
(2), (4) Date: Sep. 29, 2008

(87) PCT Pub. No.: WO2007/065966

PCT Pub. Date: Jun. 14, 2007

(65) Prior Publication Data

US 2009/0220310 A1 Sep. 3, 2009

(30) Foreign Application Priority Data

Dec. 7, 2005 (FI) .................................. 20051262

(51) Int. Cl.
*B65G 53/00* (2006.01)
(52) U.S. Cl. ........................ 406/48; 406/153; 406/168
(58) Field of Classification Search .................. 406/47, 406/48, 153, 168; 222/442; 366/163.2
See application file for complete search history.

(56) References Cited

U.S. PATENT DOCUMENTS

| | | | | |
|---|---|---|---|---|
| 870,981 A | * | 11/1907 | Matchette et al. ........... | 417/189 |
| 1,965,866 A | * | 7/1934 | Tolman, Jr. .................. | 96/244 |
| 2,992,858 A | * | 7/1961 | Pendleton .................... | 406/168 |
| 3,874,860 A | * | 4/1975 | Larsson ....................... | 406/48 |
| 4,685,840 A | * | 8/1987 | Wolff .......................... | 406/47 |
| 5,765,728 A | * | 6/1998 | Simpson et al. ........... | 222/146.2 |
| 6,017,195 A | | 1/2000 | Skaggs | |
| 6,537,450 B2 | * | 3/2003 | Russell et al. .............. | 210/194 |
| 6,634,833 B2 | * | 10/2003 | Gillespie ..................... | 406/84 |
| 2004/0258535 A1 | | 12/2004 | Tash | |
| 2007/0183855 A1 | * | 8/2007 | Sundholm .................. | 406/141 |

FOREIGN PATENT DOCUMENTS

| | | |
|---|---|---|
| JP | 60-93034 | 5/1985 |
| JP | 2003-56500 | 2/2003 |
| WO | 2005/085104 | 9/2005 |

* cited by examiner

Primary Examiner—Joe Dillon, Jr.
(74) Attorney, Agent, or Firm—Ladas & Parry LLP

(57) ABSTRACT

A method for conveying material by applying a pressure difference in a conveying conduit (4), in which method the material is fed into the conveying conduit (4) and in the conveying conduit further into a separating device (5), where the material being conveyed is separated from conveying air, in which method a negative pressure is created in the conveying conduit (4) by means of an ejector apparatus (6), whose suction side is connected to the separating device (5), said ejector apparatus being operated using an operating medium consisting of a liquid mist, especially an aqueous liquid mist, said medium being sprayed through at least one spraying nozzle (122) into an ejector tube (128) directed into a separating element (38). In the method, the generation of the negative pressure to be produced is intensified according to need by limiting the flow of gases, such as air, into the ejector tube (128) from the direction opposite to the spraying direction of its operating medium, i.e. from the outlet end (129) of the ejector tube. The invention also relates to an apparatus and an ejector device.

9 Claims, 7 Drawing Sheets

METHOD AND APPARATUS FOR CONVEYING MATERIAL AND EJECTOR APPARATUS

BACKGROUND OF THE INVENTION

The present invention relates to a method for conveying material by applying a pressure difference in a conveying conduit, in which method the material is fed into the conveying conduit and in the conveying conduit further into a separating device, where the material being conveyed is separated from the conveying air, in which method a negative pressure is created in the conveying conduit by means of an ejector apparatus, whose suction side is connected to the separating device, said ejector apparatus being operated using an operating medium, which consists of a liquid mist, especially an aqueous liquid mist, said medium being sprayed through at least one spraying nozzle into an ejector tube directed into a separating element.

The invention also relates to an apparatus for conveying material, preferably bulk material in food industry, in particular slaughtering offal and food waste, or working residual in engineering industry, by the application of a pressure difference in a conveying conduit, said apparatus comprising a material conveying conduit, a separating device and means for creating a negative pressure in the conveying conduit by using an ejector apparatus whose suction side is connected to the separating device, said ejector apparatus being operated using an operating medium and comprising at least one nozzle for spraying a liquid mist and for using the liquid mist as the operating medium of the ejector and means for supplying a liquid to the nozzle, and which apparatus comprises at least one ejector nozzle arranged in or near an ejector tube, said ejector tube being directed towards the separating element and extending into the separating element.

The invention also relates to an ejector device.

There are prior-art material-conveying systems operated by utilizing a pressure difference, designed especially for conveying food products, such as meat products. A system of this type is disclosed in specification WO 88/01597 A. Numerous corresponding solutions exist. There are also apparatus used in conjunction with e.g. ships' galleys, where material is conveyed in a corresponding manner, typically from several places to one or more containers or for further processing. Such apparatus are also used for conveying foodstuffs and waste in various establishments. Typically, they produce a negative pressure by using a vacuum system in which a negative pressure is created in a conveying conduit by means of vacuum generators, such as an ejector apparatus. In an ejector apparatus, a suction is typically created in a conveying conduit by an ejector in which a pneumatic apparatus is used to spray pressurized air into a nozzle, which again creates a negative pressure in the conveying conduit. The conveying conduit is typically provided with at least one valve element, and the amount of replacement air entering the conduit is regulated by opening and closing the valve element. In prior-art solutions, pneumatic air is supplied to the ejector apparatus at a constant pressure. This therefore always involves the same energy consumption regardless of the actual need for pneumatic air. In possible blockage situations in the conveying conduit system, prior-art solutions have a limited applicability for clearing blockages or they require separate apparatus for this purpose. Further, current solutions have limitations regarding adaptation to conveying materials involving different requirements. Moreover, in prior-art solutions the material to be conveyed may cause problems of smell and/or particles in the blast air of the vacuum apparatus, such as an ejector apparatus. The use of conventional vacuum pumps in conjunction with or in the environment of explosible materials is very restricted or even dangerous. Also, in some prior-art solutions a liquid mist is used in conjunction with such material conveying systems. This type of background of the method and apparatus of the invention is also described e.g. in specification WO 2005/085105 and in specification WO 2005/085104. It is an objective of the invention to further develop the systems disclosed in these specifications.

The object of the present invention is to achieve a completely new type of solution to avoid the drawbacks of prior-art solutions. The object of the invention is to create a solution that will make it possible to produce a more efficient suction by an ejector apparatus in general and in particular during blockages of the conduit system used to convey material. A second specific object of the invention is to create a solution in which, on the other hand, a good yield can be produced by the ejector apparatus and the generation of negative pressure can be enhanced according to need. A further object of the invention is to create an ejector apparatus that can be utilized as a vacuum generation unit in many types of applications using negative pressure. Yet another object is to create a vacuum generation unit that will be applicable for use in conjunction with explosible or inflammable materials or environments. An additional object of the invention is to create a system that will make it possible to avoid the possible disadvantages of smell and/or particles in prior-art solutions. Yet another object is to create an ejector solution that will reduce the energy requirement.

BRIEF DESCRIPTION OF THE INVENTION

The method of the invention is mainly characterized in that the generation of the negative pressure to be produced is intensified according to need by limiting the flow of gases, such as air, into the ejector tube from the direction opposite to the spraying direction of its operating medium, i.e. from the outlet end of the ejector tube.

The apparatus of the invention is characterized in that the ejector apparatus comprises means for enhancing the negative pressure produced according to need by limiting the flow of gases, such as air, into the ejector tube from the farther end in the spraying direction of the operating medium, i.e. from the outlet end of the ejector tube.

The ejector device of the invention comprises means for enhancing the negative pressure produced according to need by limiting the flow of gases, such as air, into the ejector tube from the farther end in the spraying direction of the operating medium, i.e. from the outlet end of the ejector tube.

The ejector device of the invention is additionally characterized by what is stated in claims 22-30.

The solution of the invention has numerous significant advantages. By limiting the admission of gases into the ejector tube or to its vicinity from the "wrong end", it is possible to improve the efficiency of the ejector apparatus according to need and to increase the negative pressure, e.g. in a blockage situation occurring in the material conveying conduits. By bringing the outlet end of the ejector tube below the level of the liquid surface, a very effective solution for improving the negative pressure produced by the ejector is achieved while the entry of leakage flow into the ejector tube in a direction opposite to the spraying direction of the ejector nozzle is prevented. By using a liquid mist as operating medium, a very strong suction effect and a very good yield are achieved. In addition, a considerable energy saving effect, even 50% as compared to a pneumatically operated ejector apparatus is achieved. In addition, liquid mist is a very efficient medium for removing particles and reducing the disadvantages of smell with the ejector device. By arranging around the ejector tubes a shell part provided with an opening, preferably an opening provided with a closing element, for the outlet of conveying air. By arranging for the closing element of the openings to close e.g. in a blockage situation occurring in the conveying conduit, the suction effect of the ejector can be improved. At the same time, clearance of the blockage is promoted. By arranging a circulation of the operating medium to be sprayed, a very strong effect reducing the water consumption is achieved. In addition, if desirable and necessary, it is possible to add chemicals to the operating medium. By arranging a coaxial nozzle in the suction pipe, the efficiency of the ejector can be further improved. By producing a rotating motion in the liquid separated in the separating element, possible impurities can be more effectively separated from the liquid and prevented from getting into the liquid suction pipes. By additionally providing the apparatus with an option for feeding a second medium into the ejector device, it is possible, on the one hand, to further advantageously reduce possible smell problems at the ejector device while at the same time improving the efficiency of suction. By supplying a second medium together with the operating medium and, if necessary, using the pressure of the operating medium for conveying and/or feeding the second medium into the ejector space, a very advantageous and effective solution is achieved. By arranging the nozzle for the second medium in the same assembly with the nozzle for the operating medium, a sensible solution in respect of manufacturing technology is achieved. At the same time, a good solution for improving the suction of the ejector device is achieved. When a substance of a higher density, such as a liquid, preferably water, is used, the suction effect can be improved. On the other hand, by supplying a second medium, the suction effect can be further improved even if the operating medium is a liquid or a mixture of liquid and gas. When a liquid is used as the operating medium and/or at least as the second medium, the gas flow can be washed by spraying this liquid, thereby eliminating possible disadvantages regarding particles and smell. Using a separate pump to supply the second medium allows easy control of its supply. In addition, the ratio between operating medium and second medium can be adjusted at the same time. By adjusting the pressure of the operating medium going to the ejector as necessary, significant energy savings are achieved. In addition, by adjusting the pressure, it is possible to influence the suction produced by the ejector, which is a handy way of adjusting the negative pressure and/or pressure difference in the material conveying conduit as well. By implementing the pressure adjustment using parallel flow paths provided with a throttle element and a valve which is opened and closed on the basis of impulses received from the control system, a very usable and easily modifiable adjustment system is achieved. If desirable, the conveying of material can be started with a higher pressure produced in the ejector and the pressure can be reduced as the conveying process advances. Different supply stations of the system can handle different materials, for which it is possible to set different pressure requirements and thus the settings affecting the conveying of the materials. On the other hand, in conjunction with different supply stations it is possible to arrange a switch that the operator can use to define, e.g. according to the material being supplied, the pressure values to be used in conveying the material. By arranging for the throttle elements to be adjustable, the versatility of the system can be further improved, so it can be adapted for the conveying of materials of different kinds. The system provides a possibility of e.g. varying the pressure difference/(negative) pressure in the material conveying conduit, and this property can be further extended by arranging according to the invention an openable and closeable connection for pneumatic air to the material conveying conduit. By using, according to an embodiment of the invention, means for observing the flow in the suction pipe between the separating device and the ejector device, the operation of the apparatus can be regulated on the basis of variations in this flow. By further arranging for the material removal means of the separating device to function on the basis of commands given by the regulating system, and additionally preferably to use pneumatic air as their operating medium, the functionality of the system can be further improved. The solution of the invention is excellently applicable for use for conveying other types of material as well, such as waste produced in engineering industry, e.g. for conveying chips. The ejector device of the invention can be used in conjunction with many types of conveying systems. Moreover, the ejector device can be used as a vacuum generator in conjunction with applications requiring a negative pressure, such as e.g. wood drying apparatus, suction graspers, smoke removal systems, dust removal systems. The ejector device is very well applicable for use in conjunction with explosible substances.

BRIEF DESCRIPTION OF THE FIGURES

In the following, the invention will be described in detail with reference to an example and the attached drawings, wherein.

DETAILED DESCRIPTION OF THE INVENTION

Figure 1:
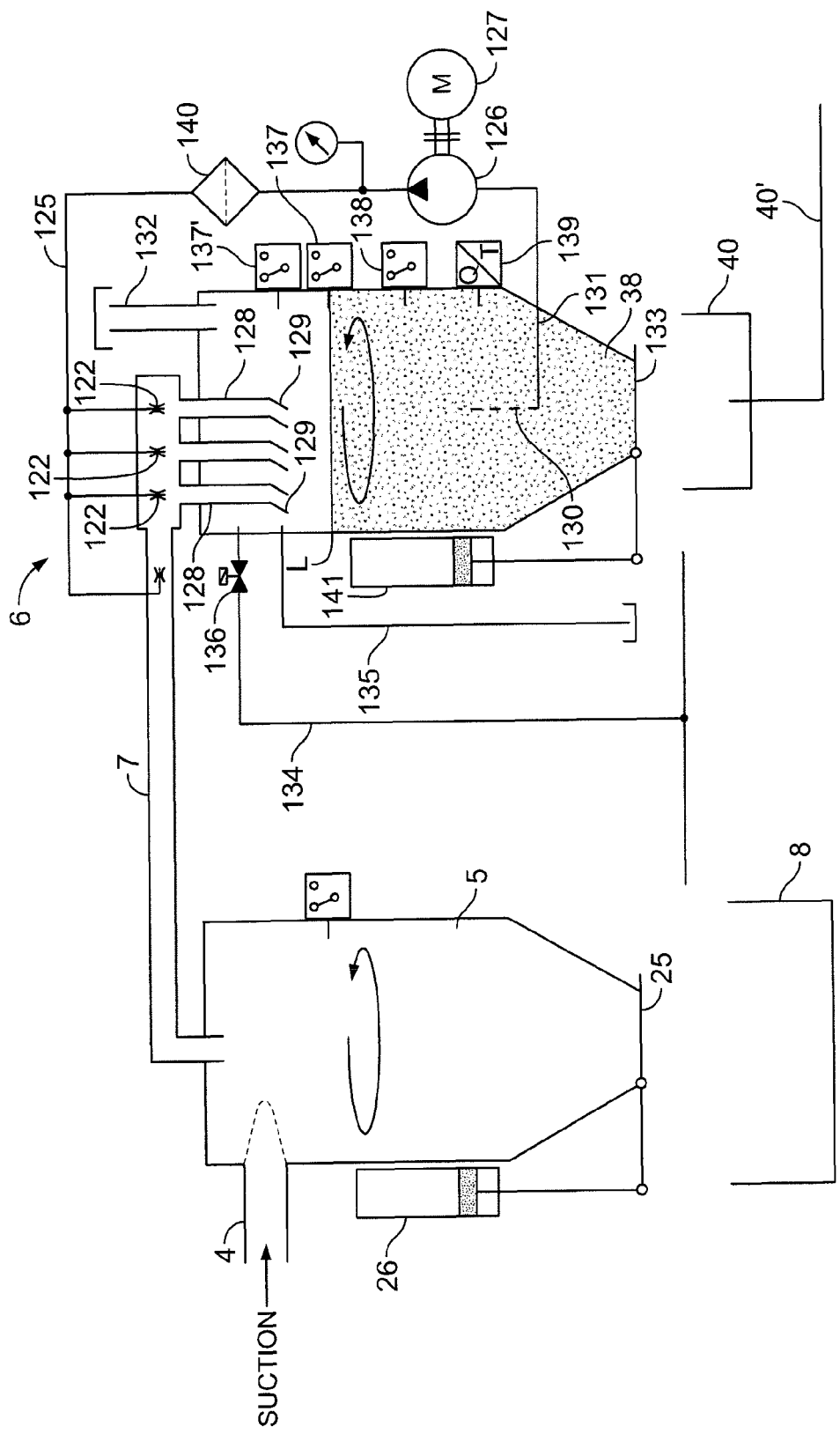
FIG. 1 presents a diagram of an embodiment of the apparatus of the invention.

The conveying conduit system typically comprises a main conveying conduit 4, to which a plurality of supply stations may be connected via feed pipes. The figure shows only part of the main conveying conduit 4. The material supplied is conveyed along the conveying conduit system into a separating device 5 placed at the termination of the conveying conduit system. In the separating device, the material conveyed is separated e.g. by centrifugal force from the conveying air. The separated material is removed, e.g. according to need, from the separating device 5 into a material container 8 or into a further processing stage. In the embodiment illustrated in the figures, the separating device 5 is provided with material removal elements 25, 26. From the separating device 5, a conduit 7 leads into a vacuum unit 6. The vacuum unit produces in the conveying conduit system 4 the negative pressure required for conveying the material. In the solutions illustrated in the figures, the vacuum unit 6 is an ejector unit. The ejector unit 6 is connected to a source of operating medium. The negative pressure provides the force required for conveying the material in the conveying conduit system. The ejector unit 6 is connected to the separating device 5 at the delivery station, the main conveying conduit 4 being in turn connected to the separating device.

Arranged in the conveying conduit 4, preferably at the opposite end of the conveying conduit relative to the separating device 5, is at least one valve element, which is opened and closed as necessary. When a negative pressure prevails in the conveying conduit 4, replacement air is fed into the conveying conduit 4. This ensures that the material to be conveyed moves in the conveying conduit 4 towards the separating device 5.

Figure 2:
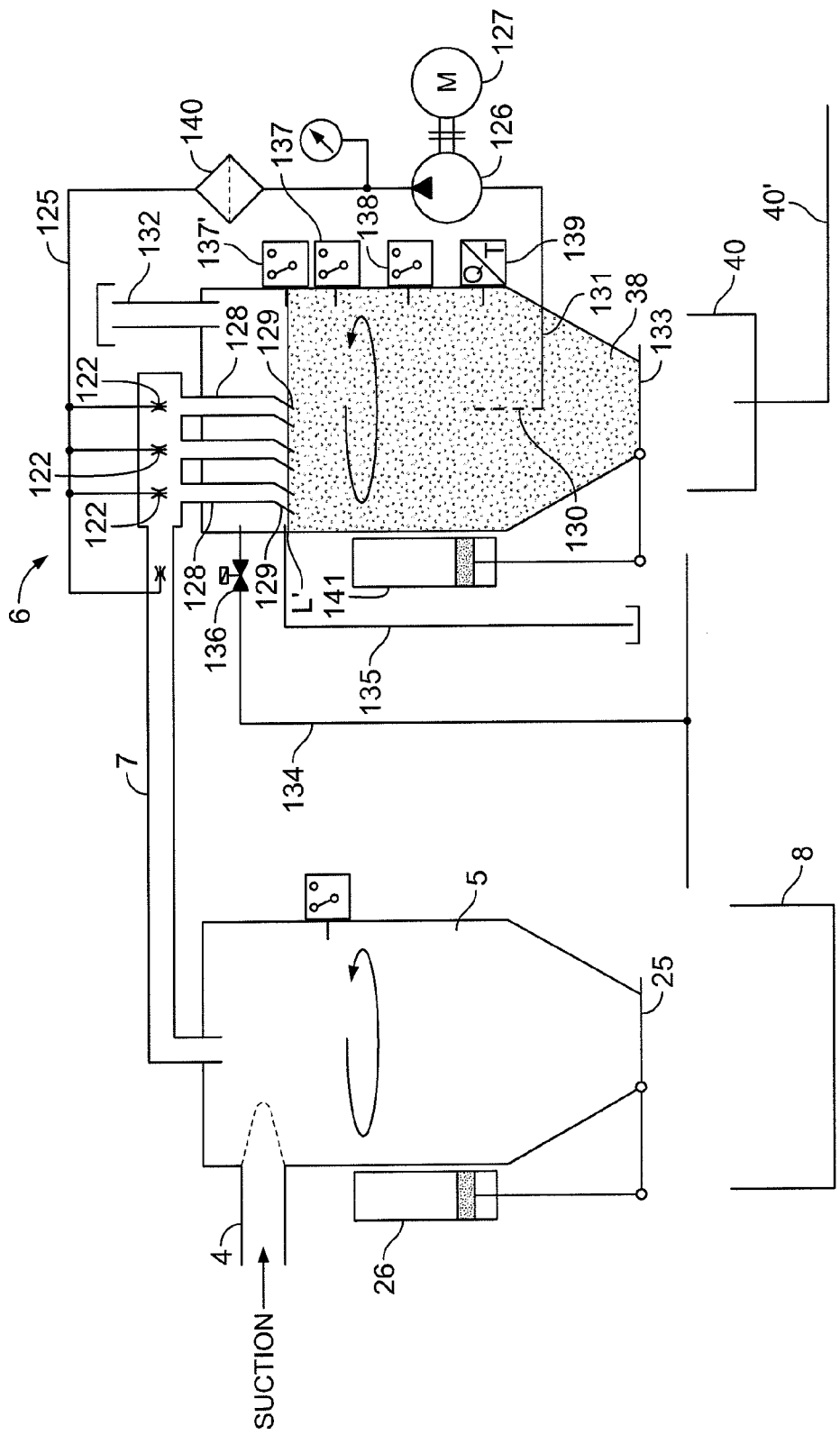
FIG. 2 presents a diagram of an embodiment of the apparatus of the invention in another situation.

FIGS. 1 and 2 present an embodiment of the method and apparatus of the invention in which the operating medium used in the ejector apparatus 6 is a liquid spray, especially a liquid mist. The apparatus comprises at least one operating medium nozzle 122, which is preferably directed towards the ejector tube 128. In the figure, three ejector nozzles 122 are arranged side by side, and correspondingly there are three parallel ejector tubes 128, one for each ejector nozzle. The ejector tubes 128 are directed towards a separating element 38, which in the embodiment illustrated is a container-like component. The ejector tubes 128 are directed towards the separating element 38, which in the embodiment illustrated in the figure is a container-like component.

The outlet end of the ejector tube 128 extends into the separating element. The separating element 38 comprises means for separating the liquid and/or solid material from the gas flow. For this purpose, the flow caused by the ejector device is typically deflected so that the liquid drops and/or material particles or at least part of them remain in a collecting element. In the embodiment illustrated in the figure, the liquid gathered in the separating element is circulated by pump means 126, 127 back through ducts 131, 125, so that it can be sprayed again through at least one ejector nozzle 122. Arranged in the duct is a filter element 140. Preferably the suction pipes 130, 131 are also provided with a rough filter placed at or near the inlet opening.

The ejector tube 128 can be so directed that it produces a rotating motion in the separating element 38. In the solution according to the figure, the end 129 of the ejector tube 128 is directed to create a tangential flow component so as to produce a rotating motion of the liquid. The rotating motion allows e.g. heavier particles and solid pieces to be brought closer to the walls of the separating element, and therefore the suction pipes 130, 131 for liquid circulation are preferably arranged to be at a distance from the edges of the container-like separating element 38. Via circulation of the liquid, it is possible to utilize substances, chemicals, such as purifying agents or equivalent, mixed in the liquid. The separating element is provided with a closing element 133, allowing at least some of the material and liquid accumulated in the separating element to be removed into a separate container 40, sewer 40' or to a further processing stage. The closing element can be operated by an actuator 141, such as a cylinder-piston combination or some other device.

The separating element 38 may typically comprise an arrangement for monitoring the surface level, implemented using e.g. limit switches 137, 138. More liquid can be supplied into the separating element via a duct 134 provided with a valve element, which can be controlled, e.g. according to signals given by the limit switches 137, 138 or according to need. The apparatus may also comprise means 139 for monitoring the flow of the medium. These means may comprise a flow transducer arranged in the separating element to transmit information on the basis of which the ejector device and/or the filling/emptying of the separating element are/is controlled. The separating element also comprises an overfill protector pipe 135, through which any excess amount of liquid accumulated in the separating element 38 is passed e.g. into the sewer. The separating element is provided with a gas exhaust valve 132, through which any gases having reached the separating element can exit, preferably in a washed state, from the separating element.

The invention thus relates to a method for conveying material in a conveying conduit 4 by utilizing a pressure difference, in which method the material is fed into the conveying conduit 4 and through the conveying conduit further into a separating device 5, where the material conveyed is separated from conveying air, in which method a negative pressure is created in the conveying conduit 4 by an ejector apparatus 6, the suction side of which is connected to the separating device 5, said ejector apparatus being operated using an operating medium, which is a liquid mist, especially an aqueous liquid mist, said medium being sprayed through at least one spraying nozzle 122 into an ejector tube 128 directed towards a separating element 38.

According to the invention, the generation of the negative pressure to be produced is enhanced according to need by limiting the flow of gases, such as air, into the ejector tube 128 from the direction opposite to the spraying direction of its operating medium, i.e. from the outlet end 129 of the ejector tube. A typical situation where the generation of negative pressure is enhanced is a blockage having occurred in the conveying conduit system 4, 7.

According to an embodiment of the method, the admission of gases from the outlet end 129 into the ejector tube 128 is limited by bringing the aforesaid end of the ejector tube 128 to a level below the level L, L' of the liquid surface. This allows the ejector apparatus to be moved and/or the liquid level to be raised.

The invention also relates to an apparatus for conveying material, preferably bulk material in food industry, in particular slaughtering offal and food waste, or working residual in engineering industry, by the application of a pressure difference in a conveying conduit 4, said apparatus comprising a material conveying conduit 4, a separating device 5 and means for creating a negative pressure in the conveying conduit by using an ejector apparatus 6 whose suction side is connected to the separating device 5, said ejector apparatus being operated using an operating medium, the ejector apparatus 6 comprising at least one nozzle 121, 122 for spraying a liquid mist and for using the liquid mist as the operating medium of the ejector and means 125, 126, 127, 131 for supplying a liquid to the nozzle, and which apparatus comprises at least one ejector nozzle 122 arranged in or near an ejector tube 128, said ejector tube being directed towards a separating element 38 and extending into the separating element 38. The apparatus comprises means for enhancing the generation of the negative pressure to be produced according to need by limiting the flow of gases, such as air, into the ejector tube 128 from its distal end 129 relative to the spraying direction of the operating medium, i.e. from the outlet end of the ejector tube.

In the embodiment illustrated in FIGS. 1 and 2, the outlet end 129 of the ejector tube is brought to a level below the level L, L' of the liquid surface by adjusting the level of the liquid surface in the separating element from the situation in FIG. 1, where the liquid surface is at level L, to the situation in FIG. 2, where the liquid surface is at level L'. In this situation, the liquid surface level has reached the outlet end 129 of the ejector tubes 128. The surface level can be kept at this position e.g. by control commands obtained from limit switch 137'.

Figure 3:
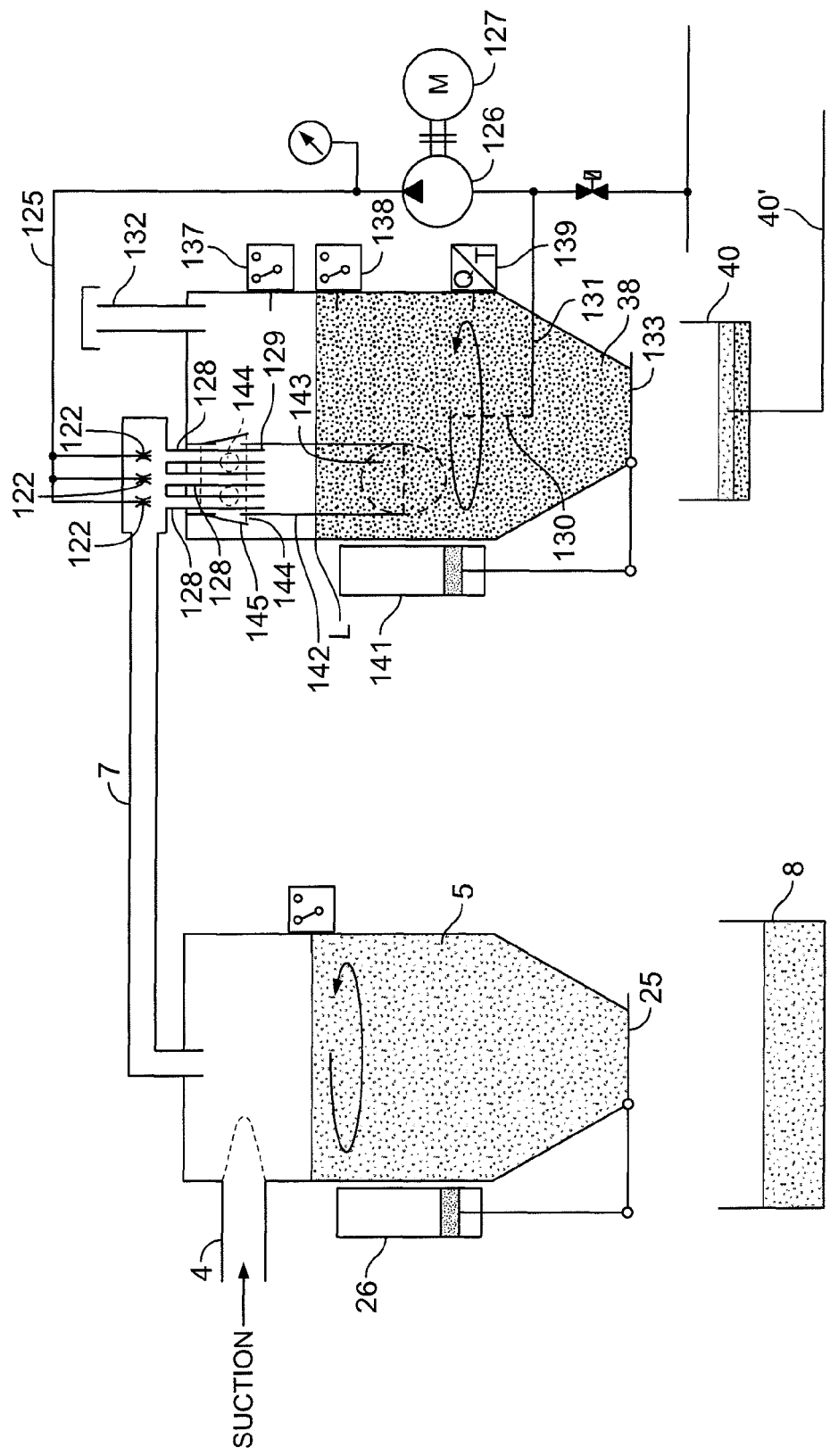
FIG. 3 presents a diagram of an embodiment of the apparatus of the invention in a normal situation.
Figure 4:
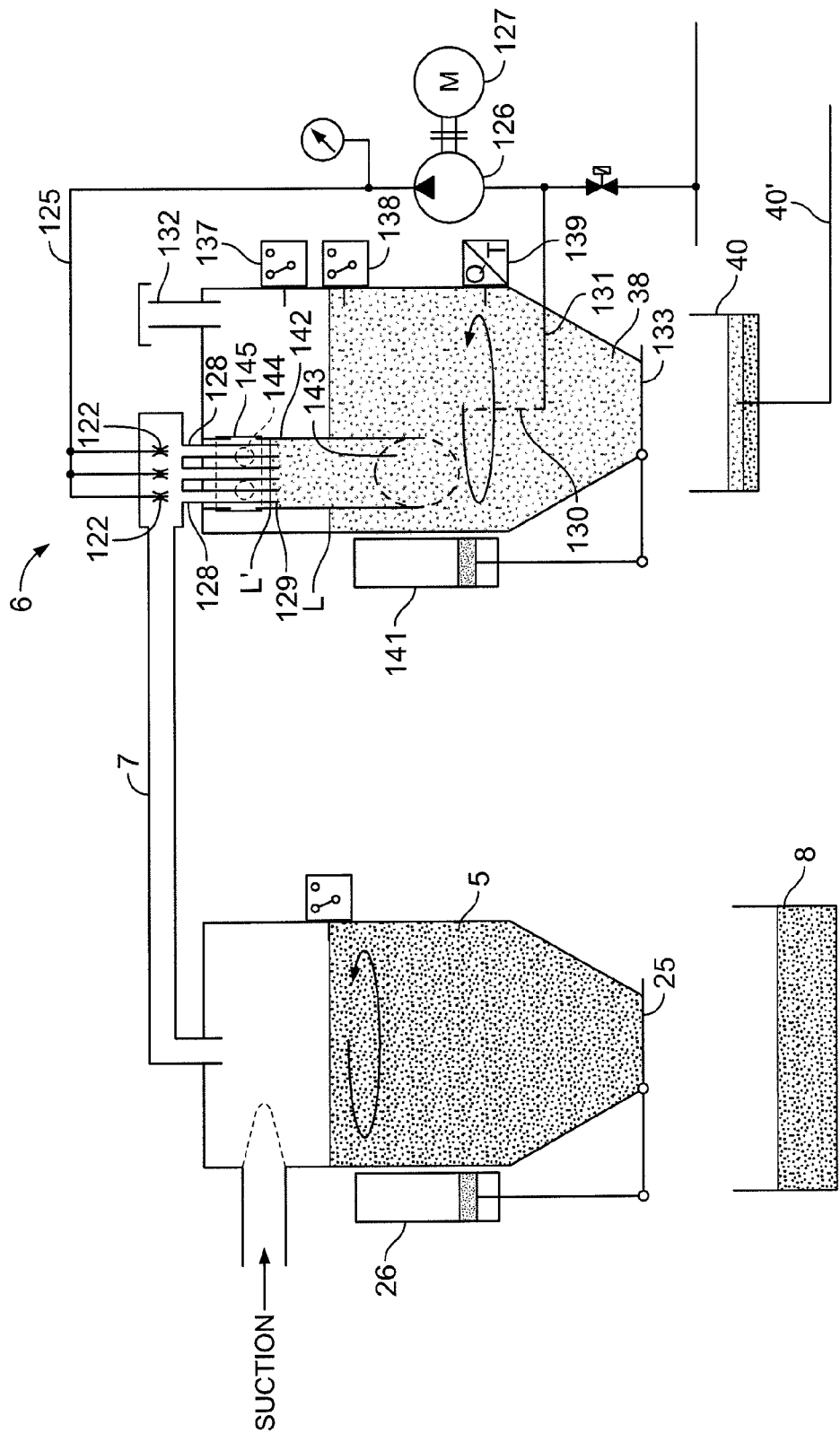
FIG. 4 presents the apparatus according to the embodiment presented in FIG. 3 in another situation.

FIGS. 3 and 4 present a second embodiment of the invention, in which the operating medium is sprayed into the ejector tube 128, which extends into the separating element 38 inside a shell part 142. Here, the conveying gas is passed through an outlet opening 144 provided in the shell part 142. In this embodiment, at least the flow of gases into the space inside the shell part 142 is limited, at least in the event of a blockage in the conveying conduit 4, 7. Thus, the passage of gases to the ejector tube is limited. According to an embodiment of the invention, the flow of gases is limited by means of a closing element 145. The flow of gases can be further limited by raising the liquid surface level L, L' at least inside the shell part 142.

According to an embodiment, the material to be conveyed preferably consists of bulk material in food industry, especially slaughtering offal or food waste, or working residue in engineering industry.

By using a liquid as an operating medium, or by supplying a liquid mist as a second operating medium or as a second medium, the solution of the invention aims at achieving a "sealing effect" in the ejector tube, thereby enhancing the suction effect. By using a liquid mist as operating medium, a good volume of ejector spray is achieved, and the suction effect and ejector efficiency and also the "sealing effect" have been found to be very good. Especially in the case of a blockage occurring in the conveying conduits 4, the efficiency of the vacuum unit can be significantly improved by the method of the invention. In the method of the invention, the admission of gases, such as air, into the ejector tube 128 from the opposite direction relative to the ejector spray 122, i.e. from the outlet end 129 of the tube in the figures, is limited. According to the invention, the arrangement can be implemented in several ways.

By using a liquid mist in the solution of the invention, disadvantages of smell and/or particles can be eliminated and/or the suction effect of the ejector apparatus is enhanced. The medium used is typically a liquid medium, especially water.

According to a preferred embodiment of the method, at least most of the second medium and/or operating medium is separated from the gas flow. This is done after the material flow coming through the suction pipe 7 has been mixed in the operating medium flow and/or in the second medium flow. The operating medium flow and/or the second medium flow have/has had an effect, typically a washing effect, on the flow having come through the suction pipe. The gas flow coming from the ejector, containing liquid droplets and/or material particles, is deflected in such manner that the material particles carried in it are left in the collecting element 38, from where they are typically conveyed away. The purified gas flow is conducted away. The operation of some of the above-mentioned features will be described later on in more detail.

FIGS. 1 and 2 present yet another preferred embodiment of the apparatus of the invention, in which the pipe 7 is provided with a nozzle 121 for spraying an operating medium, preferably water mist. The nozzle enhances the suction effect produced by the apparatus, and it additionally enhances the purification of the gas flow. The nozzle 121 is arranged, preferably coaxially, in the pipe 7. In addition to nozzle 121, there may be at least one ejector nozzle 122 and ejector tube 128 arranged after nozzle 121 in the direction of flow, the ejector tube being directed towards the separating element 38. In the embodiment illustrated in FIG. 6, the nozzle 121 and the ejector nozzle 122 are arranged at an angle relative to each other. The nozzles produce a suction in their vicinity, causing the gas flow to be mixed with the spray, preferably a liquid mist spray, efficient purification of the gas flow being thus achieved.

The spraying of the operating medium and therefore the suction in the pipe 7 can be regulated according to need, e.g. by adjusting the spraying pressure generated by a pump.

FIGS. 3 and 4 present a preferred embodiment of the apparatus of the invention. Here, one or more ejector tubes 128 are surrounded by a preferably tubular shell 142, the lower end 143 of which, in the embodiment illustrated, has been arranged to extend below the liquid surface level L in the separating element 38. Formed in the shell 142 is at least one opening 144, through which in a normal situation at least some of the gas, such as air, drawn in by the ejector via the suction pipe 7 can get into the air space above the liquid surface L in the separating element 38 and from there further out of the separating element through a gas exhaust valve 132 provided in the separating element 38. Depending on the operating medium, e.g. in the case of a liquid operating medium, in particular a liquid mist, the gases preferably leave the separating element in a "washed state". In the embodiment in the figure, at least one opening 144 has been formed in the shell 142 in the region between the end 129 of the ejector tube 128 and the spraying point of the ejector 122 as seen in the direction of the ejector tube 128. According to a preferred embodiment, at least one opening 144 in the shell 142 is provided with a closing element 145. The closing element 145 is movable between at least two positions, a first position, in which the passage for the medium through the opening 144 is open, and a second position, in which the passage for the medium through the opening 144 is substantially closed. According to an embodiment, the closing element 145 is a clappet element, which permits medium flow from inside the shell through the opening 144 to outside the shell. If the pressure difference between the inside and outside of the shell 142, in the area of the opening 144, changes so that the pressure outside the shell 142 is higher, then the clappet 145 will close. The closing element 145 in this embodiment thus works like a check-valve, permitting medium flow from inside to outside the shell but not from outside to inside the shell. Alternatively, it is conceivable that no closing element is provided in conjunction with the openings 144, but a closing element could possibly be placed e.g. in conjunction with the exhaust valve 132.

In the embodiment illustrated in the figure, the shell is provided with several openings 144, preferably positioned in a distributed manner on the circumference of the shell 142. The lower end 143 of the shell 142 is open, so the liquid sprayed by the ejector can get into the separating element 38, into its liquid containing section. According to an embodiment, the lower end of the shell is shaped so as to impart a rotating motion to the liquid.

In a normal situation (FIG. 3), at least a proportion of the gases drawn in by the ejector is deflected and flows out of the shell through the openings 144 while the liquid remains in the separating element. If there arise blockages in the suction pipes 4, 7, e.g. due to the material being conveyed, then the amount of gases coming through the suction pipe is reduced, with the result that the closing elements 145 on the openings 144 of the ejector shell 142 are closed and the ejector automatically tries to increase the vacuum and therefore the suction in the suction pipes 4, 7.

FIG. 4 illustrates this situation. The closing elements 145 have closed the openings 144. Due to the pressure difference, the liquid level L' inside the shell 142 rises to a height somewhat above the surface level L of the liquid in the separating element outside the shell 142. This makes it possible to enhance the suction effect, so the blockage in the conduit system 4 can hopefully be removed. The liquid surface level L' preferably rises above the outlet end 129 of the ejector tube 128. This effectively prevents the entry of gases into the ejector tube 128 against the spraying direction.

Figure 5:
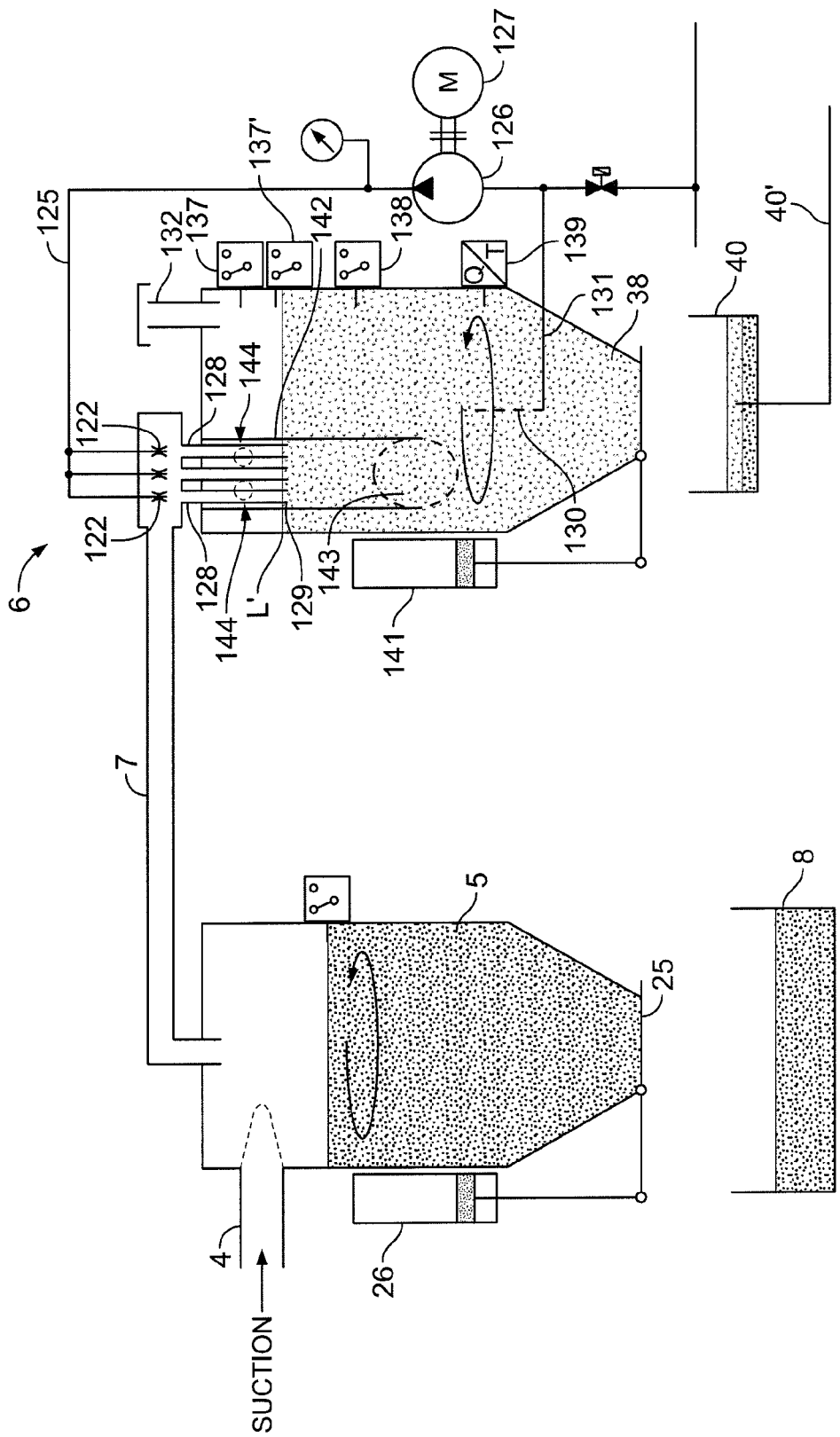
FIG. 5 presents yet another embodiment of the apparatus of the invention.

FIG. 5 presents yet another embodiment of the solution of the invention, in which the shell 142 has no closing elements in conjunction with the openings 144. In this case, when necessary, the negative pressure can be increased by raising the level of the liquid surface in the separating element 38 as stated in connection with FIGS. 1 and 2 while the outlet ends of the ejector tubes remain below the liquid surface level L'. The entry of gases into the ejector tube 128 against the spraying direction is now effectively prevented.

Figure 6:
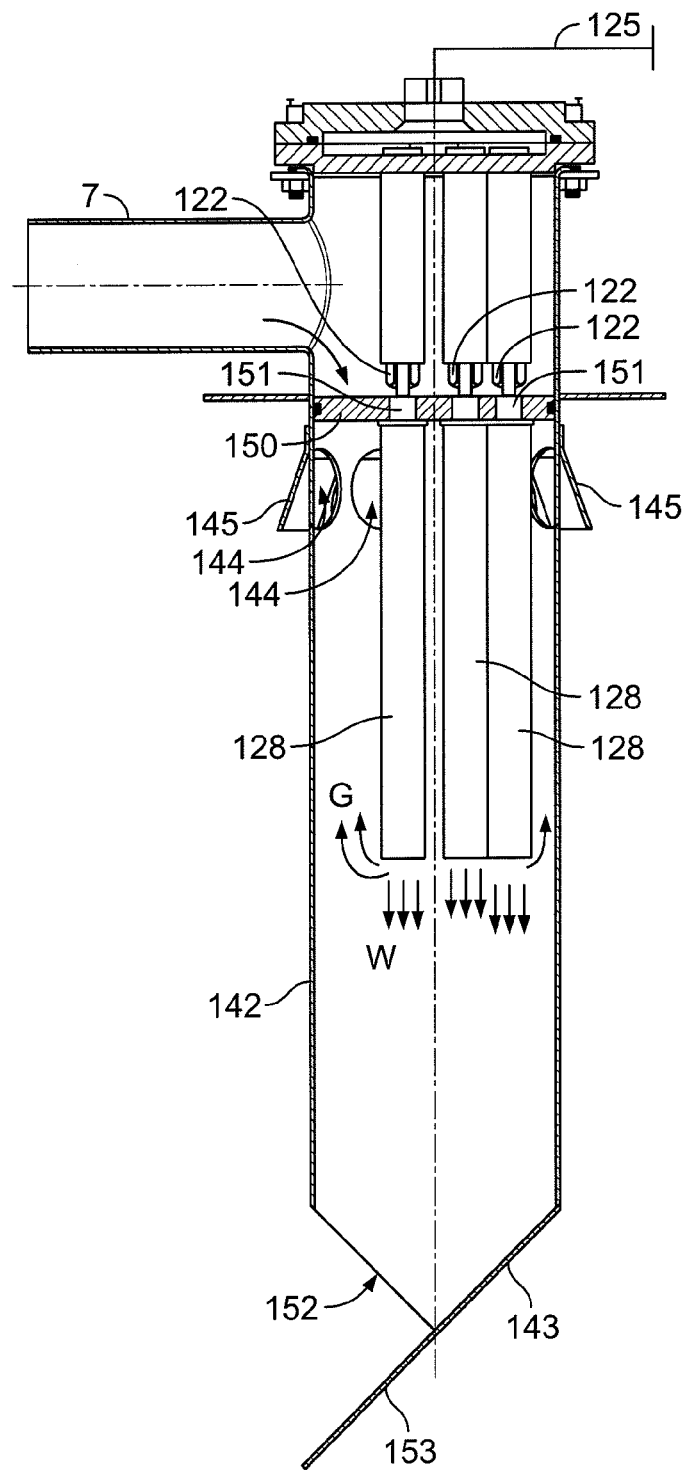
FIG. 6 presents an ejector apparatus according to the invention.

FIG. 6 presents an ejector unit which, in the embodiment illustrated in the figure, comprises an ejector jet 122, to which the operating medium is conveyed via a pressurized line 125, presented diagrammatically. It can be used e.g. in the embodiment illustrated in FIGS. 3 and 4. Connected to the spraying chamber is a suction pipe 7, from which a gas, such as air, flows into the ejector jets and with them into the ejector tubes 128. The ejector tubes 128 are surrounded by a shell 142. At the upper end of the shell is a partition 150, which is provided with openings 151 formed at positions aligned with each ejector tube 128, through which opening the spray from the ejector jet 122 can get into the ejector tube together with the air drawn along by it. Formed in the shell wall is at least one opening 144. The opening 144 has been formed in the shell in the area between the upper part of the shell 142 and the lower end of the ejector tubes 128. In the embodiment illustrated in the figure, the shell has several openings formed in it. The openings 144 have been formed in a distributed manner along the circumference of the shell 142. Provided in conjunction with the opening 144 is a closing element 145. In the embodiment in the figure, the closing element 145 is a clappet element mounted on the outer surface of the shell outside the opening 144. The clappet element has been arranged to be movable between at least two positions, a first position, in which the flow path through the opening 144 is open, and a second position, in which the flow path through the opening 144 is closed. According to an embodiment, the closing element 145 is formed from an elastic material, such as rubber or plastic.

In the lower part 143 of the shell is an outlet port 152, through which at least some of the medium sprayed exits into the separating element 38. The port may be so oriented that the medium flowing out imparts a rotating motion to the liquid in the separating element. As shown in FIG. 6, a guide element 153 has been formed in conjunction with the outlet port 152 to direct the exiting medium flow.

Figure 7:
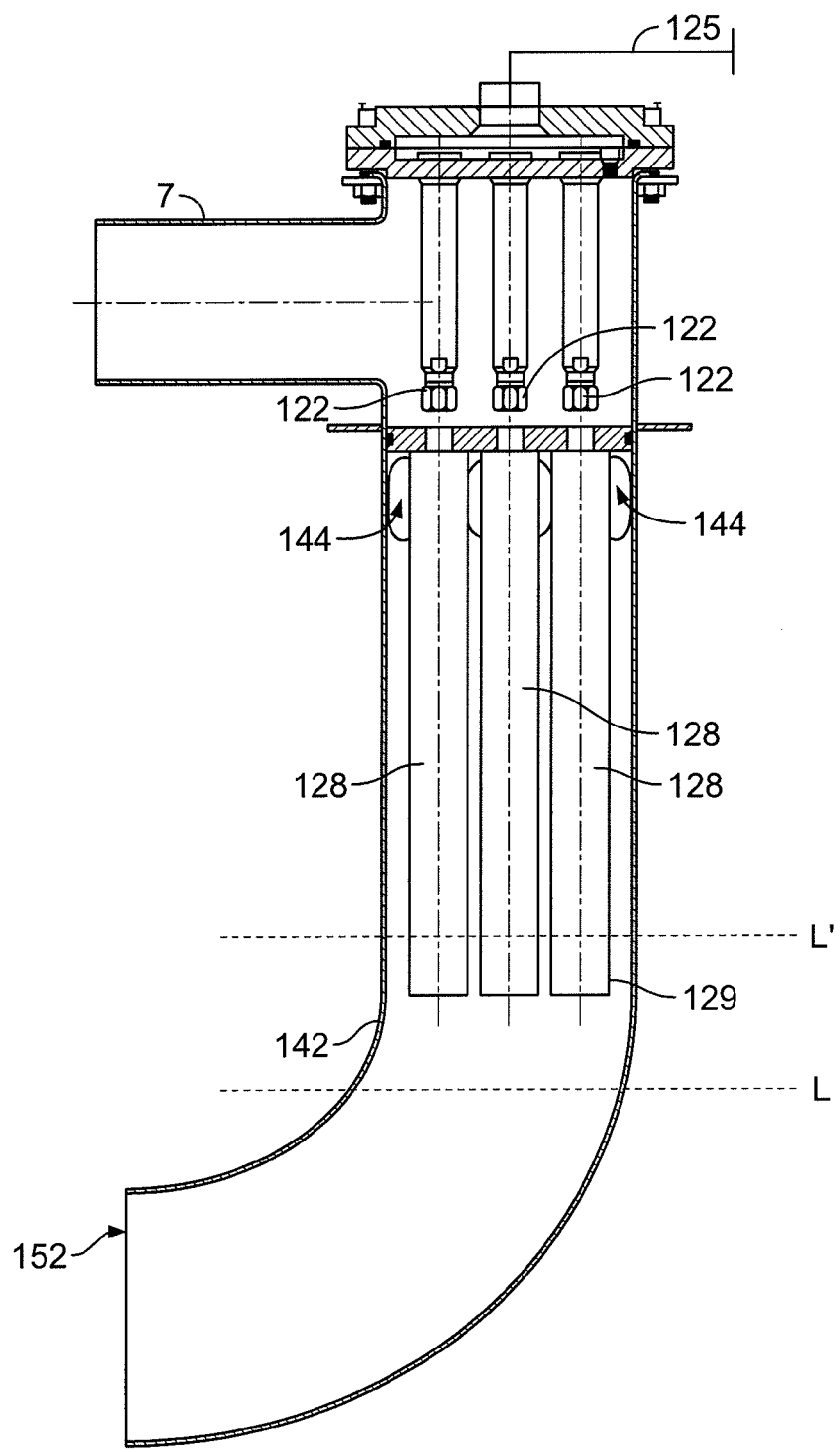
FIG. 7 presents a second embodiment of the ejector apparatus of the invention.

FIG. 7 presents yet another embodiment of the ejector unit, which can be used e.g. in the embodiment according to FIG. 5. The shell element 142 has a tubular shape, with its outlet end directed as desirable. In the solution illustrated in the figure, due to the curved shape of the shell 142, the outlet port 152 is oriented at an angle of almost 90° relative to the ejector tubes 128. The figure additionally visualizes with broken lines the change L-L' of the liquid surface level in an eventual blockage situation.

The ejector device of the invention comprises at least one ejector nozzle 122 and at least one ejector tube 128, into which the ejector nozzle sprays, and a passage for bringing a second medium into the ejector jet 122. The device comprises means for enhancing the negative pressure produced, according to need by limiting the flow of gases, such as air, into the ejector tube 128 from the distal end 129 relative to the spraying direction of the operating medium, i.e. from the outlet end 129 of the ejector tube.

According to an embodiment, the shell part 142 has been arranged around the ejector tube and has at least one opening 144 formed in the shell. In a second embodiment, the shell 142 is additionally provided with means 145 for shutting off or limiting the flow through the opening 144. In one embodiment, the opening 144 is disposed in the shell 142 in the area between the upper part of the shell and the lower part of the ejector tube 128.

Formed in the lower part of the shell 142 is an opening 152 for discharge of the ejector's operating medium and/or removal of the material being conveyed.

Provided in conjunction with the opening 144 is a clappet element 145 for shutting off and/or limiting the flow through the opening (144).

In yet another embodiment, means for directing the medium flow are provided in conjunction with the opening 152 in the lower part of the shell 142.

According to a preferred embodiment, the device comprises means for bringing, at least when necessary, the outlet end 129 of the ejector tube 128 to a level below the liquid surface level L, L' near the ejector apparatus. Typically at least one of the two, either the liquid surface and/or the ejector tube, are/is moved relative to each other. An ejector device according to FIGS. 6 and 7 can be used as a vacuum generator in many types of applications requiring negative pressure.

With the apparatus of the invention, a significant improvement can be achieved in the vacuum produced by the apparatus. In an embodiment of the solution of the invention, the vacuum has typically been about 0.3-0.4 bar, and even a vacuum of about 0.9 bar has been reached by using the method and apparatus of the invention. It is to be noted that the above-mentioned vacuum values are only examples, so the vacuum values reachable may vary according to the adjustment range of the system.

By using an aqueous liquid as operating medium and spraying a liquid mist, a very effective solution for an ejector device is achieved. In this context, liquid mist refers to spraying with $Dv_{50}$<1000 micrometers, i.e. with an average droplet size below 1 mm. In some cases, the droplet size (Dv 90) of the liquid mist may even be considerably smaller, below 200 µm. If desirable, the operating medium can be sprayed with a high pressure, preferably 10-300 bar, but in some cases even lower pressures are also applicable. Typically, it is possible to use pressures in the lower part of the range, e.g. 10-50 bar, preferably 15-30 bar. As compared to a pneumatically operated ejector, a saving of up to 50% in the energy requirement is achieved. In addition, the system is considerably more durable in respect of service life than vacuum pumps, which have also been used to generate a negative pressure.

The background of the method and apparatus of the invention is dealt with e.g. in specification WO 2005/085105 and also in specification WO 2005/085104.

The invention can be applied in the conveying of a wide variety of materials. An advantageous application is also found in systems for conveying waste material produced in engineering industry, such as working residue, preferably chips.

The ejector device of the invention can be used in connection with a very wide variety of conveying systems. In addition, the ejector device can also be used more generally as a vacuum generator in conjunction with applications requiring a negative pressure, such as e.g. wood drying apparatus, suction graspers, smoke removal systems, dust removal systems. The ejector device is very well applicable for use in conjunction with explosible substances.

It is obvious to the person skilled in the art that the invention is not limited to the embodiments described above, but that it may be varied within the scope of the following claims.

Features that may have been presented together with other features in the description can also be used separately from each other if necessary.

The invention claimed is:

1. Method for conveying material by applying a pressure difference in a conveying conduit (4), in which method the material is fed into the conveying conduit (4) and in the conveying conduit further into a separating device (5), where the material being conveyed is separated from conveying air, in which method a negative pressure is created in the conveying conduit (4) by means of an ejector apparatus (6), whose suction side is connected to the separating device (5), said ejector apparatus being operated using an operating medium consisting of a liquid mist, said medium being sprayed through at least one spraying nozzle (122) into an ejector tube (128) directed into a separating element (38), characterized in that the generation of the negative pressure to be produced is enhanced according to need by limiting the flow of gases into the ejector tube (128) from the direction opposite to the spraying direction of said operating medium defined by the outlet end (129) of the ejector tube.

2. Method according to claim 1, characterized in that the admission of gases into the ejector tube (128) from the outlet end (129) is limited by bringing the aforesaid end of the ejector tube (128) below the level (L, L') of the liquid surface.

3. Method according to claim 1, characterized in that the outlet end (129) of the ejector tube is brought to a level below the level (L, L') of the liquid surface by adjusting the level of the liquid surface in the separating element.

4. Method according to claim 1, characterized in that operating medium is sprayed into the ejector tube (128), which extends into the separating element (38) inside a shell part (142).

5. Method according to claim 4, characterized in that the conveying gas is passed through an outlet opening (144) of the shell part (142).

6. Method according to claim 4, characterized in that at least the flow of gases into the space inside the shell part (142) is limited, at least in the event of a blockage in the conveying conduit (4, 7).

7. Method according to claim 6, characterized in that the flow of gases is limited by means of a closing element (145).

8. Method according to claim 6, characterized in that the flow of gases is limited by raising the level (L, L') of the liquid surface 25 at least inside the shell part (142).

9. Method according to claim 1, characterized in that the material to be conveyed consists of bulk material in food including slaughtering offal or food waste, or working residue in engineering industry.

* * * * *